US009830570B2

(12) United States Patent
Ray

(10) Patent No.: US 9,830,570 B2
(45) Date of Patent: Nov. 28, 2017

(54) SYSTEMS AND METHODS FOR PROVIDING ITEM DELIVERY NOTIFICATION

(75) Inventor: Christine R. L. Ray, Washington, DC (US)

(73) Assignee: UNITED STATES POSTAL SERVICE, Washington, DC (US)

( * ) Notice: Subject to any disclaimer, the term of this patent is extended or adjusted under 35 U.S.C. 154(b) by 1522 days.

(21) Appl. No.: 12/013,901

(22) Filed: Jan. 14, 2008

(65) Prior Publication Data

US 2008/0133261 A1    Jun. 5, 2008

Related U.S. Application Data

(63) Continuation of application No. 10/362,824, filed as application No. PCT/US01/27505 on Sep. 6, 2001, now abandoned.

(60) Provisional application No. 60/230,795, filed on Sep. 7, 2000.

(51) Int. Cl.
*G06Q 10/08* (2012.01)
*G06Q 10/10* (2012.01)
*G06Q 30/06* (2012.01)

(52) U.S. Cl.
CPC ......... *G06Q 10/08* (2013.01); *G06Q 10/0833* (2013.01); *G06Q 10/10* (2013.01); *G06Q 30/0601* (2013.01)

(58) Field of Classification Search
CPC .... G06Q 10/08; G06Q 10/0833; G06Q 10/10; G06Q 30/0601
USPC .......... 705/26.1, 26, 406, 407, 408; 235/385
See application file for complete search history.

(56) References Cited

U.S. PATENT DOCUMENTS

| 5,444,444 | A  | 8/1995 | Ross        |
|-----------|----|--------|-------------|
| 5,786,748 | A  | 7/1998 | Nikolic et al. |
| 6,021,942 | A  | 2/2000 | Monico      |
| 6,038,542 | A  | 3/2000 | Ruckdashel  |
| 6,081,827 | A  | 6/2000 | Reber et al. |
| 6,336,100 | B1 | 1/2002 | Yamada      |

(Continued)

OTHER PUBLICATIONS

U.S. Appl. No. 60/203,402.*
Final Office Action in U.S. Appl. No. 10/362,824, dated Nov. 20, 2006.
Non-Final Office Action in U.S. Appl. No. 10/362,824, dated Mar. 6, 2006.

(Continued)

*Primary Examiner* — Yogesh C Garg
(74) *Attorney, Agent, or Firm* — Finnegan, Henderson, Farabow, Garrett & Dunner, LLP

(57) ABSTRACT

A method and system for providing item delivery notification consistent with the invention includes sending a first notification to a recipient at a recipient notification address, the first notification indicating that an item has been placed in a delivery system directed to the recipient at a first address. Next, the method involves sending a second notification to a sender at a sender notification address if the item is successfully delivered to the recipient at the first address, the second notification indicating that the item has been delivered. Then the method involves sending a third notification to the sender at the sender notification address if the item is not successfully delivered to the recipient at the first address, the third notification indicating that the item has not been delivered. And finally, the method involves sending a fourth notification to the recipient at the recipient notification address if the item is not successfully delivered to the recipient at the first address, the fourth notification indicating that the item has not been delivered.

21 Claims, 4 Drawing Sheets

(56) References Cited

U.S. PATENT DOCUMENTS

| | | |
|---|---|---|
| 6,463,354 B1 | 10/2002 | Pintsov |
| 6,701,215 B1 | 3/2004 | Stadermann |
| 6,976,007 B1* | 12/2005 | Boucher et al. ............... 705/28 |
| 6,978,929 B2* | 12/2005 | Buie et al. .................... 235/382 |
| 6,994,253 B2 | 2/2006 | Miller et al. |
| 7,133,743 B2 | 11/2006 | Tilles et al. |
| 2001/0037247 A1 | 11/2001 | Haseltine |
| 2002/0026380 A1* | 2/2002 | Su ................................ 705/26 |
| 2002/0032623 A1 | 3/2002 | Wheeler et al. |
| 2002/0035515 A1 | 3/2002 | Moreno |
| 2003/0208411 A1 | 11/2003 | Estes et al. |
| 2004/0084519 A1* | 5/2004 | Barta et al. .................... 235/375 |
| 2005/0252596 A1* | 11/2005 | Olsen ..................... B07C 7/005 156/64 |
| 2006/0026047 A1 | 2/2006 | Jones |

OTHER PUBLICATIONS

Chabrow, Eric R., "Data is Part of the Package," Abstract, Informationweek, Issue No. 559, p. 43, Dec. 25, 1995.

Jastrow, David, "Delivering Parcels of Data," Abstract, Computer Reseller News, Issue No. 796, pp. 37 and 41, Jun. 29, 1998.

Hitachi Ltd., "Books Delivery Notification System of Library Information Processing System," Derwent Abstract of Japanese Patent Application No. 11053432 A, Feb. 26, 1999.

Fujitsu General Ltd., "Goods Delivery Notifying Apparatus," Derwent Abstract of Japanese Patent Application No. 07123159 A, May 12, 1995.

International Search Report for PCT/US01/27505, dated Dec. 13, 2001.

International Preliminary Examination Report for PCT/US01/27505, dated Jan. 27, 2003.

Non-Final Office Action in U.S. Appl. No. 10/362,824, dated Jul. 13, 2007.

* cited by examiner

SYSTEMS AND METHODS FOR PROVIDING ITEM DELIVERY NOTIFICATION

RELATED APPLICATION

This application is a continuation of application Ser. No. 10/362,824, filed Feb. 27, 2003 now abandoned, which is a national stage filing under 35 U.S.C. §371 of PCT Application No. PCT/US01/27505 filed Sep. 6, 2001, which claimed the benefit of U.S. provisional application No. 60/230,795, filed Sep. 7, 2000, all of which are incorporated herein by reference.

TECHNICAL FIELD

The present invention relates to the field of providing item delivery notification. More particularly, the present invention, in various specific embodiments, involves methods and systems directed to providing a link between the contents of a physical mailbox and a notification address.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. By virtue of the limited size of a typical mailbox and due to the fact that many recipients may not be at home when an item is delivered, recipients may need to physically visit a central location, such as a post office, in order to obtain a package. For example, a recipient may need to go to a post office to pick up a package if the package was too large for the recipient's mail box or if the sender required personal delivery and the package delivery was attempted when the recipient was not at home.

Therefore, the need to efficiently provide item delivery notification in a delivery system has become a common need for the United States Postal Service and many other organizations. More specifically, efficiently providing a link between the contents of a physical mailbox and a notification address has become a critical service for many delivery system operators. This is because in an increasingly competitive environment, meeting and exceeding the expectations of those who receive a service is essential for a service provider.

One solution to the item delivery notification problem is for the system operator to provide a notification at the address where the item was to be delivered if the item delivery cannot be completed. For example, the delivery system operator may attempt to deliver a package, but learns after a visit to the physical mailbox that the package is too large for the physical mail box or that the recipient is not home to receive the package as required by the sender. In this situation, the delivery system operator will provide a notification of the attempted delivery at the recipient's address. Typically, this notification is in the form of a note card left at the recipient's physical mailbox. This procedure, however, requires that the recipient return to the recipient's address to receive the notification. Great inefficiencies are created in this procedure because, for example, if the recipient on the way home from work passes the post office containing the package, the recipient may be required to make a special trip to obtain the item or must delay receiving the package and combine obtaining the package with another trip. Accordingly, efficiently providing item delivery notification in a delivery system remains an elusive goal. Thus, there remains a need for efficiently providing item delivery notification services in a delivery system. In addition, there remains a need for efficiently linking contents of a physical mailbox with a notification address.

SUMMARY OF THE INVENTION

In accordance with the current invention, an item delivery notification method and system are provided that avoid the problems associated with prior art item delivery notification systems as discussed herein above.

In one aspect, a method for providing item delivery notification consistent with the invention includes sending a first notification to a recipient at a recipient notification address, the first notification indicating that an item has been placed in a delivery system directed to the recipient at a first address; sending a second notification to a sender at a sender notification address if the item is successfully delivered to the recipient at the first address, the second notification indicating that the item has been delivered; sending a third notification to the sender at the sender notification address if the item is not successfully delivered to the recipient at the first address, the third notification indicating that the item has not been delivered; and sending a fourth notification to the recipient at the recipient notification address if the item is not successfully delivered to the recipient at the first address, the fourth notification indicating that the item has not been delivered.

In another aspect, a system for providing item delivery comprises a component for sending a first notification to a recipient at a recipient notification address, the first notification indicating that an item has been placed in a delivery system directed to the recipient at a first address; a component for sending a second notification to a sender at a sender notification address if the item is successfully delivered to the recipient at the first address, the second notification indicating that the item has been delivered; a component for sending a third notification to the sender at the sender notification address if the item is not successfully delivered to the recipient at the first address, the third notification indicating that the item has not been delivered; and a component for sending a fourth notification to the recipient at the recipient notification address if the item is not successfully delivered to the recipient at the first address, the fourth notification indicating that the item has not been delivered.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
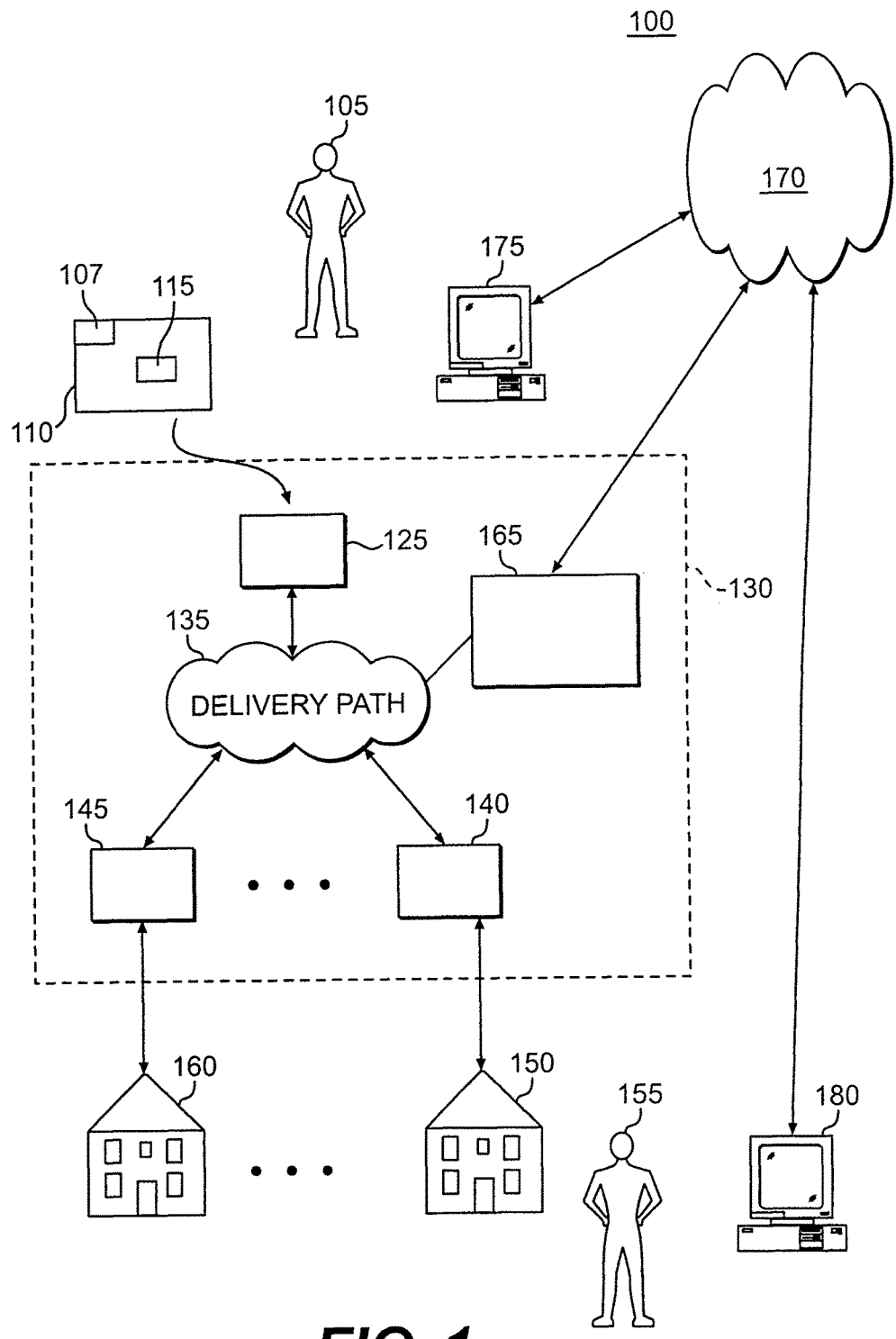
FIG. 1 is a functional block diagram of a system for providing item delivery notification consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Referring to FIG. 1, an embodiment of the present invention provides an item delivery notification system 100. For example, a sender 105 places an item 110 into a delivery system 130. Item 110 contains address label 115 indicating a first address 150 of a recipient 155 and a return address 107 indicating where to return item 110 if necessary. Item 110 is routed through delivery system 130. Delivery system 130 comprises a sender plant 125, a delivery path 135, a first address plant 140, an alternative address plant 145, and an alternative processing point 165. Delivery path 135 comprises a plurality of plants similar to sender plant 125, first address plant 140 and alternative address plant 145. The plants within delivery path 135 contain, among other things, automated systems and sorting equipment and are designed to receive and process a plurality of items. Delivery system 130 is configured to sense tracking indicia placed on item 110 as it passes through the elements of delivery system 130 directing the movement of item 110 through delivery system 130.

The tracking indicia sensed by delivery system 130 may comprise a bar code or a PLANET code. A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising delivery system 130.

In the item delivery notification process, item 110 is sent through delivery system 130 by sender 105 to first address plant 140. At any time in the delivery process a determination may be made as to whether item 110 is undeliverable. If it is determined that item 110 is undeliverable, item 110 may be forwarded to alternative processing point 165 where an ancillary service may be performed. Examples of such ancillary services are recycle service (treating item 110 as waste), NIXIE service, and Computerized Forwarding Service (CFS).

With respect to NIXIE service, NIXIE is a classification given to an item that cannot be sorted or is undeliverable-as-addressed because of an incorrect, illegible, or insufficient delivery address. If item 110 is undeliverable-as-addressed, address correction service (re-label with a correct address) or return service (return item to the sender) may be performed. In this case, a NIXIE operator specialized in the handling of such items is required. If item 110 requires return service, return address 107 on item 110 is read and item 110 is sent to return address 107 accordingly. Return address 107 is an element of item 110 that is usually placed in the upper left corner of item 110 to indicate the address of sender 105. This address indicates where sender 105 wants item 110 returned if it is undeliverable. In addition return address 107 may indicate where sender 105 will receive a bill for any fees due for the return of item 110. When item 110 requires address correction service, a NIXIE operator obtains the proper address of recipient 155 or the reason for non-delivery. While NIXIE processing may comprise address correction service or return service, those skilled in the art will appreciate that may other types of NIXIE processing may be performed.

Computerized forwarding service is a centralized, computerized address label-generating operation that forwards undeliverable-as-addressed items to recipients. In this case, recipient 155 pre-registers an alternative address 160 of recipient 155 with the delivery system operator in order to have all items forwarded to alternative address 160. For example, when recipient 155 moves and wishes to have items sent to alternative address 160, recipient 155 notifies the delivery system operator of alternative address 160. Once the delivery system operator is notified of alternative address 160, all items sent to first address 150 are detected by delivery system 130, re-labeled, and then forwarded to alternative address 160. In the aforementioned computerized forwarding service, items are forwarded only for a specific period of time. The delivery system operator expects recipient 155 to contact each and every sender who recipient 155 may expect to receive an item and notify the possible senders of the address change of recipient 155. After the computerized forwarding service time period is complete, the delivery system operator will cease forwarding items to recipient 155 and will return to the sender 105 all items sent to first address 150.

If ancillary services were required, item 110 may remain at alternative processing point 165 or may be processed at an item recovery section of alternative processing point 165. Item 110 may be recovered by sender 105 or recipient 155 upon the completion of a tracer. A tracer is a form completed by sender 105 or recipient 155 to locate delayed or undelivered items. While item recovery may occur at alternative processing point 165, those skilled in the art will appreciate that may other types of processing may be performed at alternative processing point 165.

Still referring to FIG. 1, the delivery system operator may communicate with either sender 105 or recipient 155 over a communications system 170. For example, a customer support representative located at alternative processing point 165 may send: 1) a first notification to recipient 155 at a recipient notification address indicating that item 110 has been placed in delivery system 130 directed to recipient 155 at first address 150; 2) a second notification to sender 105 at a sender notification address indicating that item 110 has been delivered; 3) a third and a fourth notification to sender 105 and recipient 155 respectively, indicating that item 110 has not been delivered; or 4) a fifth notification to sender 105 at the sender notification address indicating that item 110 has been obtained if recipient 155, for example, picks up item 110 rather than the delivery system operator delivering item 110.

In the present embodiment, preferred methods of the invention utilize a sender computer 175, a recipient computer 180, and a delivery system operator computer (not shown), which are typically a personal computer or other similar microcomputer-based workstation. Those skilled in the art, however, will appreciate that sender computer 175, recipient computer 180, and delivery system operator computer may comprise any type of computer operating environment such as hand-held devices, multiprocessor systems, microprocessor-based or programmable consumer electronics, minicomputers, mainframe computers, and the like. Sender computer 175, recipient computer 180, and delivery system operator computer may also be practiced in distributed computing environments where tasks are performed by remote processing devices. Sender computer 175, recipient computer 180, and delivery system operator computer have the capability of connecting to communications system 170. If the Internet is utilized as communications system 170, this connection can be made utilizing e-mail generally through the use of a standard e-mail software package such as Microsoft Corporation's OUTLOOK or GROUPWISE marketed by Novell, Inc. In this example where communications system 170 is the Internet, the sender notification address and the recipient notifications address are e-mail addresses for the sender 105 and recipient 155 respectively. Sender 105, recipient 155, and delivery system operator typically connect sender computer 175, recipient computer 180, and delivery system operator computer respectively to the Internet through an Internet service provider (ISP) (not shown), in the manner as is known to those skilled in the art. In addition to Internet based e-mail, the delivery system operator may communicate with either sender 105 or recipient 155 over communications system 170 utilizing regular mail, facsimile, web pages, or an interactive voice response systems. Those skilled in the art will appreciate that many other types of communications system 170 may be used.

In addition to utilizing a wire line communications system 170, the delivery system operator, sender 105, or recipient 155 may utilize a wireless communications system 170 in order to exchange e-mails via the Internet. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. Sender computer 175, recipient computer 180, and delivery system operator computer in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding voice transmission. A PDA is a handheld computer that serves as an organizer for personal information. It generally includes at least a name and address database, to-do list and note taker. PDAs are typically pen based and use a stylus to tap selections on menus and to enter printed characters. The unit may also include a small on-screen keyboard which is tapped with the pen. Data may be synchronized between the PDA and a desktop computer through a cable or wireless transmissions.

Figure 2:
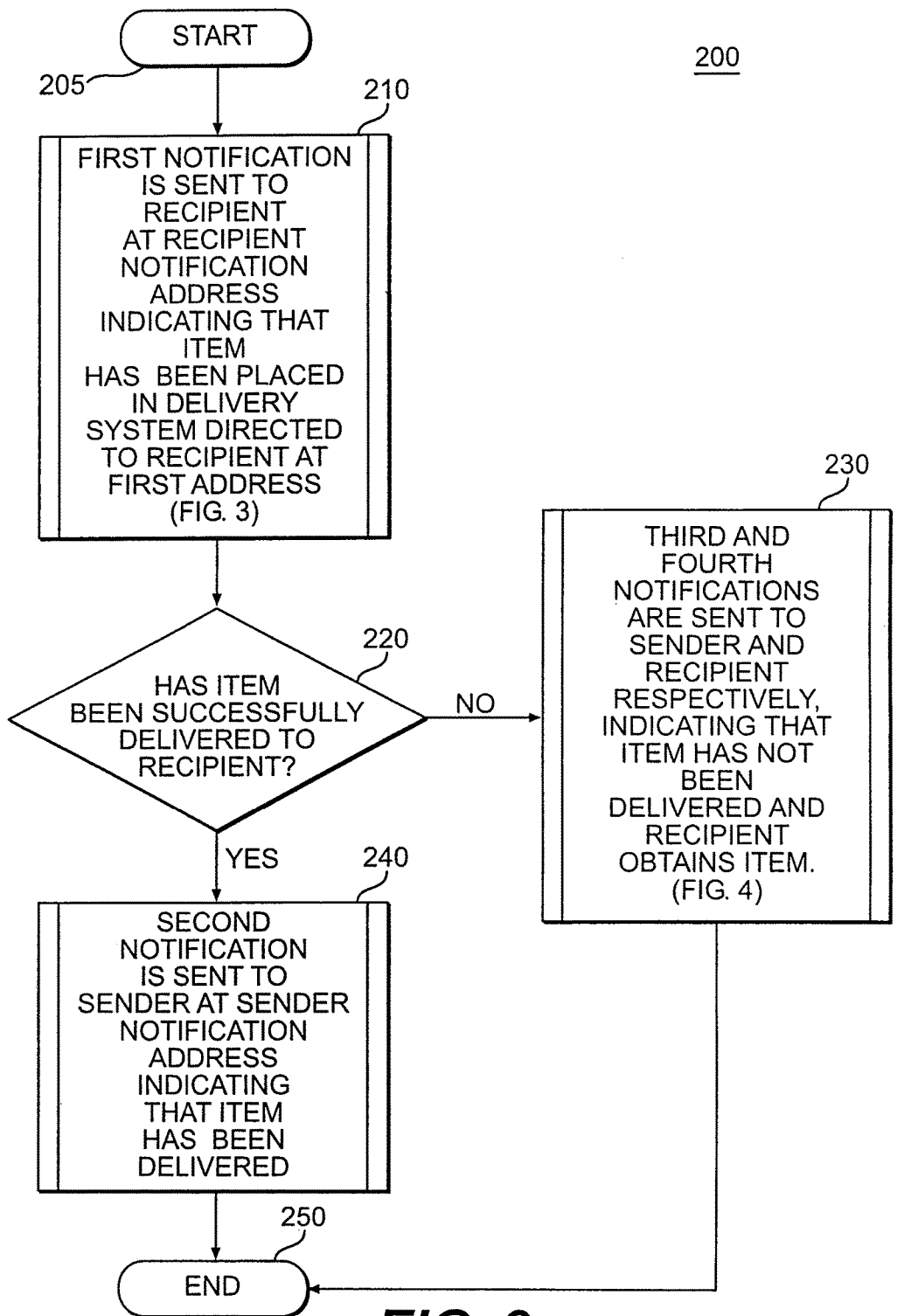
FIG. 2 is a flow chart of an exemplary method for providing item delivery notification consistent with the present invention.
Figure 3:
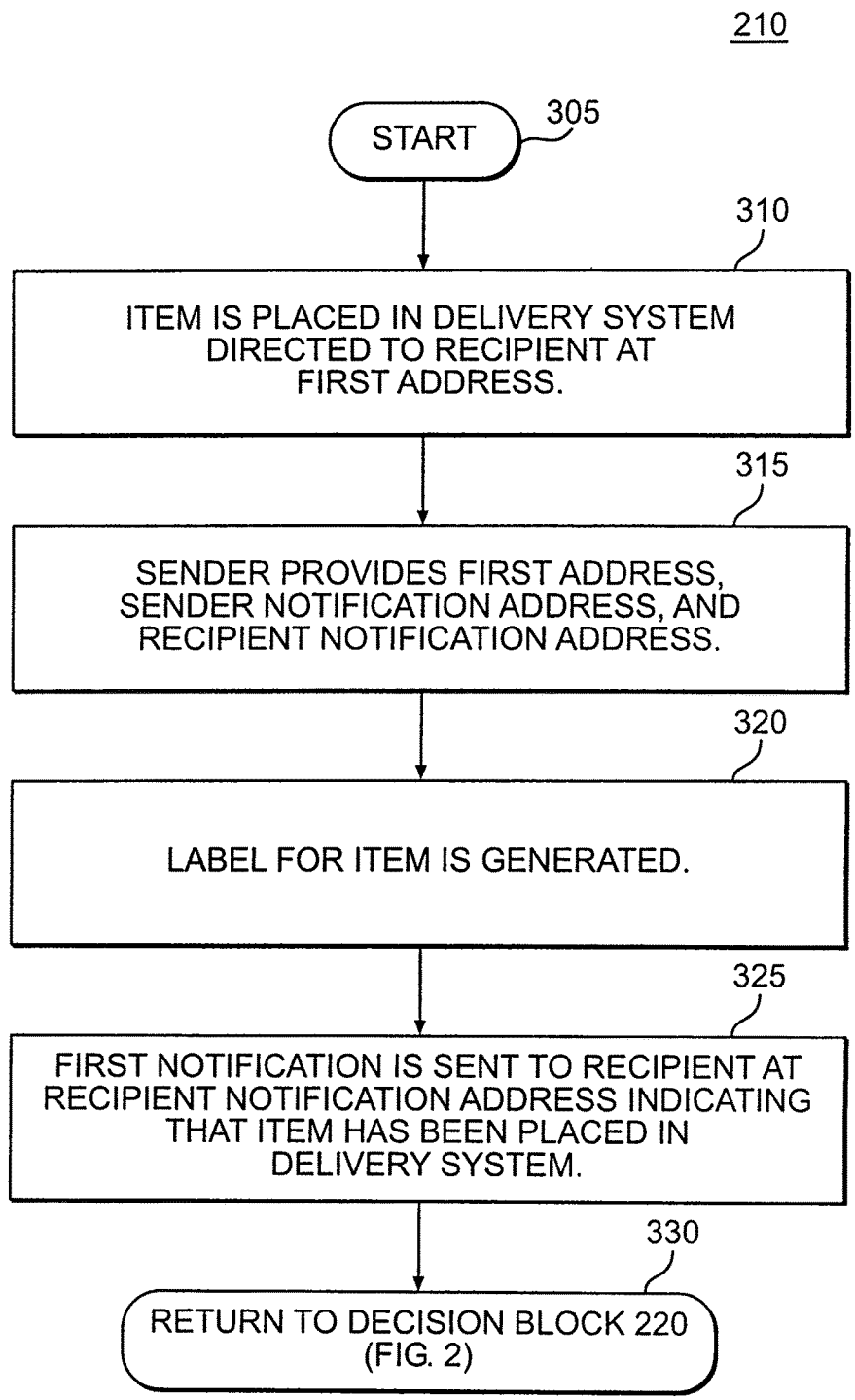
FIG. 3 is a flow chart of an exemplary subroutine used in the exemplary method of FIG. 2 for sending a first notification to a recipient at a recipient notification address.

FIG. 2 is a flow chart setting forth the general stages involved in an exemplary method 200 for providing item delivery notification. The implementation of the stages of method 200 consistent with the present invention will be described in greater detail in FIG. 3 and FIG. 4. Exemplary method 200 begins at starting block 205 and proceeds to exemplary subroutine 210 where the first notification is sent to recipient 155 at the recipient notification address indicating that item 110 has been placed in delivery system 130 directed to recipient 155 at first address 150. The stages of exemplary subroutine 210 are shown in FIG. 3 and will be described in greater detail below.

From exemplary subroutine 210, exemplary method 200 advances to decision block 220 where it is determined if item 110 has been successfully delivered to recipient 155. Delivery system 130 comprises sender plant 125, delivery path 135, first address plant 140 and alternative address plant 145. Delivery path 135 comprises a plurality of plants similar to sender plant 125, first address plant 140 and alternative address plant 145. The plants within delivery system 130 may contain, among other things, automated systems and sorting equipment located at a plurality of locations. In executing their function, the plants comprising delivery system 130 process item 110 by checking address label 115 placed on item 110. Item 110 is then routed to the next most appropriate plant in delivery system 130. The appropriateness of the next plant in delivery system 130 depends upon the present location of item 110 in delivery system 130 and where item 110 is addressed. Ultimately, item 110 is routed in delivery system 130 to the plant that serves the delivery address indicated on item 110, according to established procedures. Thus item 110 is routed from plant to plant within delivery system 130 wherein item 110 efficiently converges on first address plant 140, which is the plant that serves the delivery address labeled on the item 110. Throughout this process, delivery system 130 tracks the progress of item 110 through delivery system 130.

Figure 4:
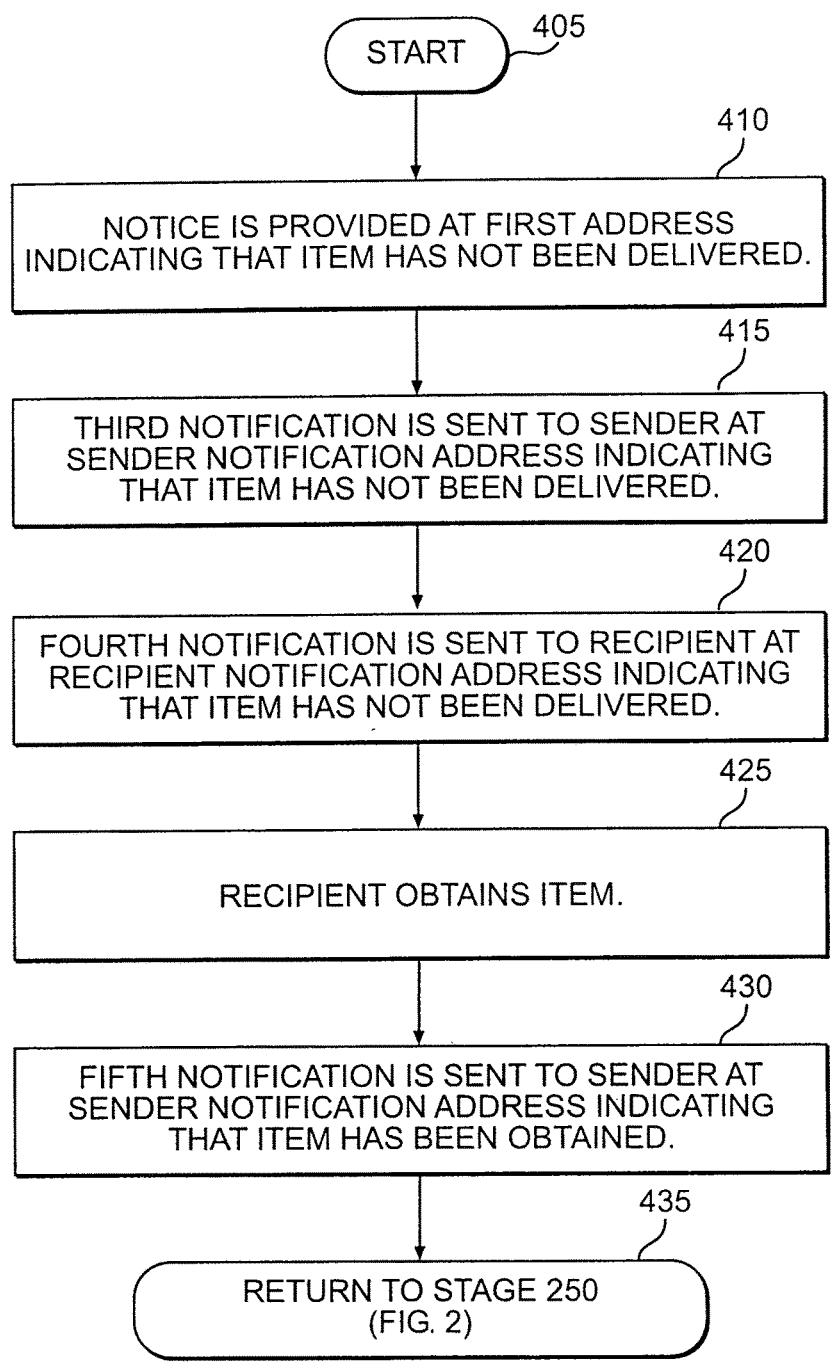
FIG. 4 is a flow chart of an exemplary subroutine used in the exemplary method of FIG. 2 for sending a third and a fourth notification to a sender and a recipient.

If item 110 has not been successfully delivered to recipient 155 at decision block 220, exemplary method 200 advances to exemplary subroutine 230 where the third and fourth notifications are sent to sender 105 and recipient 155 respectively, indicating that item 110 has not been delivered and recipient 155 obtains item 110. The stages of exemplary subroutine 230 are shown in FIG. 4 and will be described in greater detail below. From exemplary subroutine 230, exemplary method 200 continues to stage 250 where exemplary method 200 ends.

If at decision block 220 it is determined, however, that item 110 has been successfully delivered to recipient 155, exemplary method 200 continues to stage 240 where the second notification is sent to sender 105 at the sender notification address indicating that item 110 has been delivered. Situations in which a delivery can be successful are when recipient 155 is at home to receive item 110 or when item 110 is small enough to fit in the mailbox of recipient 155 and personal delivery was not requested by sender 105. In order to send the second notification, the delivery system operator can send an e-mail through the Internet to the sender notification address which delivers the second notification to sender computer 175. By this procedure, sender 105 will be notified through e-mail when item 110 has been received by recipient 155 rather than going to a separate system to key in a code to determine if item 110 has been delivered. Sender 105 can be notified periodically or when item 110 is delivered, based on criteria establish for item 110. For example, a notification to sender 105 that an EXPRESS MAIL package to a mortgage company has been delivered can be sent to sender 105 in an e-mail, thus linking information about the physical world (the mortgage company mailbox) to an electronic mailbox (sender computer 175).

From stage 240 where the second notification is sent to sender 105 at the sender notification address indicating that item 110 has been delivered, exemplary method 200 ends at stage 250.

First Notification is Sent to Recipient

FIG. 3 describes the exemplary subroutine 210 from FIG. 2 in which the first notification is sent to recipient 155 at the recipient notification address indicating that item 110 has been placed in delivery system 130 directed to recipient 155 at first address 150. Exemplary subroutine 210 begins at starting block 305 and advances to stage 310 where item 110 is placed in delivery system 130 directed to recipient 155 at first address 150. In delivering item 110 to first address 150, item 110 is routed from plant to plant within delivery system 130 wherein item 110 efficiently converges on first address plant 140, which is the plant that serves the delivery address labeled on item 110. Throughout this process, delivery system 130 tracks the progress of item 110 through delivery system 130. Once item 110 reached first address plant 140, the delivery system operator transfers item 110 from first address plant 140 to first address 150. FIG. 1 shows sender 105 placing item 110 into delivery system 130 at sender plant 125. However, item 110 may be placed in sender plant 125 or any other plant within delivery system 130. Item 110 delivered through delivery system 130 may comprise a letter or any other type mailpiece, however, those skilled in the art will appreciate that many other types of items may be delivery through delivery system 130.

After item 110 is placed in delivery system 130 directed to recipient 155 at first address 150 in stage 310, exemplary subroutine 210 advances to stage 315 where sender 105 provides first address 150, the sender notification address, and the recipient notification address. This information may be provided by an e-mail from sender computer 175 to system computer 165. In the present embodiment where the Internet is utilized as communications system 170, the sender notification address and the recipient notification address comprise the e-mail addresses of sender 105 and recipient 155 respectively. Those skilled in the are will appreciate, however, that other types of communications system 170 my be utilized. Once sender 105 provides first address 150, the sender notification address, and the recipient notification address in stage 315, exemplary subroutine 210 continues to stage 320 where label 115 for item 110 is generated. Label 115 may contain a code linking sender 105 to item 110 in addition to comprising the name of recipient 155 and first address 150.

From stage 320 where label 115 for item 110 is generated, exemplary subroutine 210 advances to stage 325 where the first notification is sent to recipient 155 at the recipient notification address indicating that item 110 has been placed in delivery system 130. Again, in the present embodiment where the Internet is utilized as communications system 170, the first notification may comprise an e-mail sent to the recipient notification address. After the first notification is sent to recipient 155 at the recipient notification address indicating that item 110 has been placed in delivery system 130 in stage 325, exemplary subroutine 210 advances to stage 330 and returns to decision block 220 of FIG. 2.

Third and Fourth Notifications are Sent

FIG. 4 describes the exemplary subroutine 230 from FIG. 2 in which the third and fourth notifications are sent to sender 105 and recipient 155, respectively, indicating that item 110 has not been delivered and recipient 155 has received item 110. Exemplary subroutine 230 begins at starting block 405 and advances to stage 410 where a notice is provided to first address 150 indicating that item 110 has not been delivered. The notice may comprise a note left at first address 150 indicating where item 110 can be obtained. Item 110 may not be delivered, for example, if recipient 155 was not at home at the time of the delivery and sender 105 requested personal delivery to recipient 155, or while personal delivery was not requested by sender 105, item 110 was too large for the mailbox of recipient 155.

After the notice is provided at first address 150 indicating that item 110 has not been delivered in stage 410, exemplary subroutine 230 advances to stage 415 where the third notification is sent to sender 105 at the sender notification address indicating that item 110 has not been delivered. Once the third notification is sent to sender 105 at the sender notification address indicating that item 110 has not been delivered in stage 415, exemplary subroutine 230 continues to stage 420 where the fourth notification is sent to recipient 155 at the recipient notification address indicating that item 110 has not been delivered. Again, in the present embodiment where the Internet is utilized as communications system 170, the sender notification address and the recipient notification address comprise the e-mail addresses of sender 105 and recipient 155 respectively.

From stage 420 where the fourth notification is sent to recipient 155 at the recipient notification address indicating that item 110 has not been delivered, exemplary subroutine 230 advances to stage 425 where recipient 155 is presented with item 110. For example, recipient 155 while on the way home from work and receives an e-mail through a PDA. From the fourth notification e-mail, recipient 155 knows that item 110 is waiting at the post office and can be picked up on the way home without creating a second trip. In addition, the fourth notification e-mail my contain information, such as a code, that allows recipient 155 to obtain item 110 from the post office or through self-service equipment holding item 110 at the post office or other central location. An example of such self-service equipment is the Mail Item Retrieval System operated by the USPS. For example, recipient 155 may present the code obtained in the fourth notification e-mail to the appropriate Mail Item Retrieval System as designated in the fourth notification e-mail. Once presented with the code, the Mail Item Retrieval System retrieves item 110 through a series of automated processes and presents item 110 to recipient 155. While the Mail Item Retrieval System operated by the USPS may be used as the self-service equipment, those skilled in the art will appreciate that other self storage equipment may be utilized.

After recipient 155 obtains item 110 in stage 425, exemplary subroutine 230 advances to stage 430 where the fifth notification is sent to sender 105 at the sender notification address indicating that item 110 has been obtained. Again, the fifth notification can be sent via e-mail. Once the fifth notification is sent to sender 105 at the sender notification address indicating that item 110 has been obtained in stage 430, exemplary subroutine 230 continues to stage 435 and returns to stage 250 of FIG. 2.

In view of the foregoing, it will be appreciated that the present invention provides a system and method for item delivery notification. Still, it should be understood that the foregoing relates only to the exemplary embodiments of the present invention, and that numerous changes may be made thereto without departing from the spirit and scope of the invention as defined by the following claims.

I claim:

1. A method for delivering an item through a delivery system, comprising:
   receiving, from a computer associated with a sender sending the item to a recipient at a first address, a sender notification address and a recipient notification address, wherein:
   the first address is a physical address,
   the sender notification address is an electronic address associated with the sender, and
   the recipient notification address is an electronic address associated with the recipient;
   associating the first address with the sender notification address and the recipient notification address;
   generating, via the delivery system, a label incorporating a code associated with one or more of the first address, the sender notification address, and the recipient notification address;
   when the item is placed in the delivery system directed to the first address,
   scanning, via an automated barcode scanner integrated within the delivery system, the code incorporated within the label;
   determining, from the scanning, one or more of the first address, the sender notification address, and the recipient notification address associated with the scanned code; and
   sending, by at least one processor, a first electronic notification to the recipient notification address associated with the first address, the first electronic notification indicating that the item was placed in the delivery system directed to the recipient at the first address;
   if the item is delivered to the first address, sending a second electronic notification to the sender notification address associated with the first address, the second electronic notification indicating that the item was delivered to the first address;
   if the item is not delivered to the first address:
   sending, by the at least one processor, a third electronic notification to the sender notification address associated with the first address, the third electronic notification indicating that the item was not delivered to the first address,
   sending a fourth electronic notification to the recipient notification address associated with the first address, the fourth electronic notification indicating (i) a pick up location and (ii) a retrieval code,
   based on scanning of the retrieval code, retrieving the item from storage at the pick up location,
   presenting the item to a recipient of the fourth electronic notification, and
   in response to retrieving the item at the pick up location, sending a fifth electronic notification to the sender notification address associated with the first address, the fifth electronic notification indicating that the item was retrieved.

2. The method of claim 1, wherein at least one of the following comprise an e-mail address: the sender notification address and the recipient notification address.

3. The method of claim 1, wherein the first, second, and third electronic notifications are sent using at least one of the following media: e-mail, facsimile, internet, and an interactive voice response system.

4. The method of claim 1 further comprising processing the item comprising at least one of the following: a mailpiece and a United States Postal Service Priority Mail package.

5. The method of claim 1, wherein the third notification further indicates the pick up location.

6. The method of claim 1 further comprising generating address label for the item, wherein the address label indicates the first address and associates the first address, the sender, and the recipient.

7. The method of claim 1 further comprising providing a notice at the first address, the notice indicating that the item was not delivered.

8. The method of claim 7, wherein the notice further indicates the pick up location.

9. The method of claim 1 further comprising receiving the item in the delivery system from the sender.

10. The method of claim 1 further comprising:
    tracking, by the at least one processor, movement of the item through the delivery system based on at least one of the first or second tracking indicia associated with the item; and
    generating non-delivery information based on the tracking.

11. A system for delivering an item through a delivery system, comprising:
    at least one processor; and
    a memory storing instructions, executed by the at least one processor, to cause the at least one processor to perform the operations of:
    receiving, from a computer associated with a sender sending the item to a recipient at a first address, a sender notification address and a recipient notification address, wherein:
    the first address is a physical address,
    the sender notification address is an electronic address associated with the sender, and
    the recipient notification address is an electronic address associated with the recipient;
    associating the first address with the sender notification address and the recipient notification address;
    generating, via the delivery system, a label incorporating a code associated with one or more of the first address, the sender notification address, and the recipient notification address;
    when the item is placed in the delivery system directed to the first address,
    scanning, via an automated barcode scanner integrated within the delivery system, the code incorporated within the label,
    determining, from the scanning, one or more of the first address, the sender notification address, and the recipient notification address associated with the scanned code,
    sending a first electronic notification to the recipient notification address associated with the first address, the first electronic notification indicating that the item was placed in the delivery system directed to the recipient at the first address;
    if the item is delivered to the first address, sending a second electronic notification to the sender notification address, the second electronic notification indicating that the item was delivered to the first address;
    if the item is not delivered to the first address:
    sending a third electronic notification to the sender notification address associated with the first address, the third electronic notification indicating that the item was not delivered to the first address, sending a fourth electronic notification to the recipient notification address associated with the first address, the fourth electronic notification indicating (i) a pick up location and (ii) a retrieval code, based on scanning of the retrieval code, retrieving the item from storage at the pick up location, presenting the item to a recipient of the fourth electronic notification, and in response to retrieving the item at the pick up location, sending a fifth electronic notification to the sender notification address associated with the first address, the fifth electronic notification indicating that the item was retrieved.

12. The system of claim 11, wherein at least one of the following comprise an e-mail address: the sender notification address and the recipient notification address.

13. The system of claim 11, wherein the first, second, and third electronic notifications are sent using at least one of the following media: e-mail, facsimile, internet, and an interactive voice response system.

14. The system of claim 11, wherein the operations performed by the at least one processor further comprise processing the item comprising at least one of the following: a mailpiece and a United States Postal Service Priority Mail package.

15. The system of claim 11, wherein the third notification further indicates the pick up location.

16. The system of claim 11, wherein the operations performed by the at least one processor further comprise generating the address label for the item, wherein the label indicates the first address and associates the first address, the sender, and the recipient.

17. The system of claim 11, wherein the operations performed by the at least one processor further comprise providing a notice at the first address, the notice indicating that the item was not delivered.

18. The system of claim 17, wherein the notice further indicates the pick up location.

19. The system of claim 11, wherein the operations performed by the at least one processor further comprise receiving the item in the delivery system from the sender.

20. The system of claim 11, the instructions further causing the at least one processor to track movement of the item through the delivery system based on tracking indicia associated with the item, and to generate non-delivery information based on the tracking.

21. A computer-implemented method for delivering an item through a delivery system, comprising:

receiving, from a computer associated with a sender sending the item to a recipient, a first address of a United States Postal Service (USPS) mailbox corresponding to a recipient, a sender notification address and a recipient notification address, the sender notification address and the recipient notification address comprising e-mail addresses;

associating the first address with the sender notification address and the recipient notification address;

generating, via the delivery system, a label incorporating a code associated with one or more of the first address, the sender notification address, and the recipient notification address;

when the item is placed in the delivery system directed to the first address, scanning, via an automated barcode scanner integrated within the delivery system, the code incorporated within the label;

determining, from the scanning, one or more of the first address, the sender notification address, and the recipient notification address associated with the scanned code;

sending, by the at least one processor, a first electronic notification to the recipient notification address associated with the first address, the first electronic notification indicating that the item was placed in the delivery system directed to the recipient at the first address;

if the item is delivered to the first address, sending, by the at least one processor, a second electronic notification to the sender notification address associated with the first address, the second electronic notification indicating that the item was delivered to the USPS mailbox;

if the item is not delivered to the first address:

sending, by the at least one processor, a third electronic notification to the sender notification address associated with the first address, the third electronic notification indicating that the item was not delivered to the USPS mailbox, sending a fourth electronic notification to the recipient notification address associated with the first address, the fourth electronic notification indicating (i) a pick up location and (ii) a retrieval code, based on scanning of the retrieval code, retrieving the item from storage at the pick up location, presenting the item to a recipient of the fourth electronic notification, and in response to retrieving the item at the pick up location, sending a fifth electronic notification to the sender notification address associated with the first address, the fifth electronic notification indicating that the item was retrieved.

* * * * *